United States Patent
Yoshida (10) Patent No.: US 9,350,971 B2
(45) Date of Patent: May 24, 2016

(54) THREE-DIMENSIONAL IMAGE PROCESSOR AND THREE-DIMENSIONAL IMAGE PROCESSING METHOD

(71) Applicant: JVC KENWOOD CORPORATION, Yokohama-shi, Kanagawa (JP)

(72) Inventor: Atsushi Yoshida, Yohohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 347 days.

(21) Appl. No.: 14/025,914

(22) Filed: Sep. 13, 2013

(65) Prior Publication Data

US 2014/0015940 A1    Jan. 16, 2014

Related U.S. Application Data

(63) Continuation of application No. PCT/JP2012/057917, filed on Mar. 27, 2012.

(30) Foreign Application Priority Data

Mar. 28, 2011   (JP) .................................. 2011-070624

(51) Int. Cl.
*H04N 13/00* (2006.01)
*H04N 13/04* (2006.01)

(52) U.S. Cl.
CPC ........... *H04N 13/0029* (2013.01); *H04N 13/04* (2013.01); *H04N 13/0007* (2013.01)

(58) Field of Classification Search
CPC .......... H04N 13/0066; H04N 13/0029; H04N 13/0022; H04N 13/0454; H04N 13/0062; H04N 13/026

USPC ....................................................... 348/42–60
See application file for complete search history.

(56) References Cited

U.S. PATENT DOCUMENTS

| | | | |
|---|---|---|---|
| 2013/0033490 A1* | 2/2013 | Zhang | G06T 15/20 345/419 |
| 2013/0038690 A1* | 2/2013 | Mitchell | A61B 1/00193 348/46 |

FOREIGN PATENT DOCUMENTS

| | | |
|---|---|---|
| JP | 2001-298753 A | 10/2001 |
| JP | 2010-107665 A | 5/2010 |
| JP | 2010-109414 A | 5/2010 |
| JP | 2010-183154 A | 8/2010 |
| JP | 2011-28263 A | 2/2011 |

*Primary Examiner* — Andy Rao
*Assistant Examiner* — Jared Walker
(74) *Attorney, Agent, or Firm* — Nath, Goldberg & Meyer; Jerald L. Meyer; Rury L. Grisham (57) ABSTRACT

A three-dimensional image processor includes an aspect conversion discriminator, an aspect conversion parameter generator, a 2D/3D conversion parameter generator, a frame memory unit and a read address controller. The aspect conversion discriminator generates a signal indicating whether or not a read position of a video signal is to be modified. The aspect conversion parameter generator generates a parameter indicating an aspect ratio of an image based on the video signal. The 2D/3D conversion parameter generator generates shift amounts for generating a left-eye signal and a right-eye signal based on the video signal. The frame memory unit temporarily stores the video signal. The read address controller controls the read position of the video signal based on the parameter and the shift amounts when the signal received from the aspect conversion discriminator indicates that the read position is to be modified.

6 Claims, 5 Drawing Sheets

FIG. 3

THREE-DIMENSIONAL IMAGE PROCESSOR AND THREE-DIMENSIONAL IMAGE PROCESSING METHOD

CROSS REFERENCE TO RELATED APPLICATION

This is a continuation application based on PCT application No. PCT/JP2012/057917 filed on Mar. 27, 2012, which claims the benefit of priority from Japanese Patent Application No. 2011-070624 filed on Mar. 28, 2011, the entire contents of which are incorporated by reference herein.

BACKGROUND

The present invention relates to a three-dimensional image processor and a three-dimensional image processing method, and more specifically, it relates to a three-dimensional image processor and a three-dimensional image processing method which are capable of switching, for display, between portrait and landscape orientations of a display image, and also capable of 2D/3D conversion.

In recent years, three-dimensional image technology has been attracting attention, which displays a pair of right and left video data with binocular parallax on a liquid crystal panel as video data for the right eye and video data for the left eye to provide a person viewing the video with a perception as if an object exists in three dimensions. A variety of techniques has been disclosed to realize such a three-dimensional video display. For example, there may be mentioned polarization filtering (passive type) such as μpol or Xpol (registered trademark), or electronic shuttering (active type).

As methods of capturing video signals to perform three-dimensional video display, there may be one that uses two cameras to perform image capturing, or one that performs 2D/3D conversion converting two-dimensional video signals into three-dimensional video signals as illustrated in Patent Literature 1 (Japanese Patent Application Laid-Open Publication No. 2001-298753). Particularly, since the method using 2D/3D conversion allows three-dimensional display of legacy video assets, it has been attracting attention in recent years and many studies are conducted.

On the other hand, among portable display devices, a display device becomes widespread that incorporates an aspect conversion technique which, as disclosed in Patent Literature 2 (Japanese Patent Application Laid-Open Publication No. 2010-107665), determines whether the display device is being viewed in a portrait or landscape orientation using a gravity sensor or the like, and changes the aspect of the display screen accordingly to switch between portrait and landscape orientations.

Here, a configuration is considered which realizes 2D/3D conversion in a display device capable of portrait and landscape viewing, using the technique of Patent Literatures 1 and 2.

Figure 1:
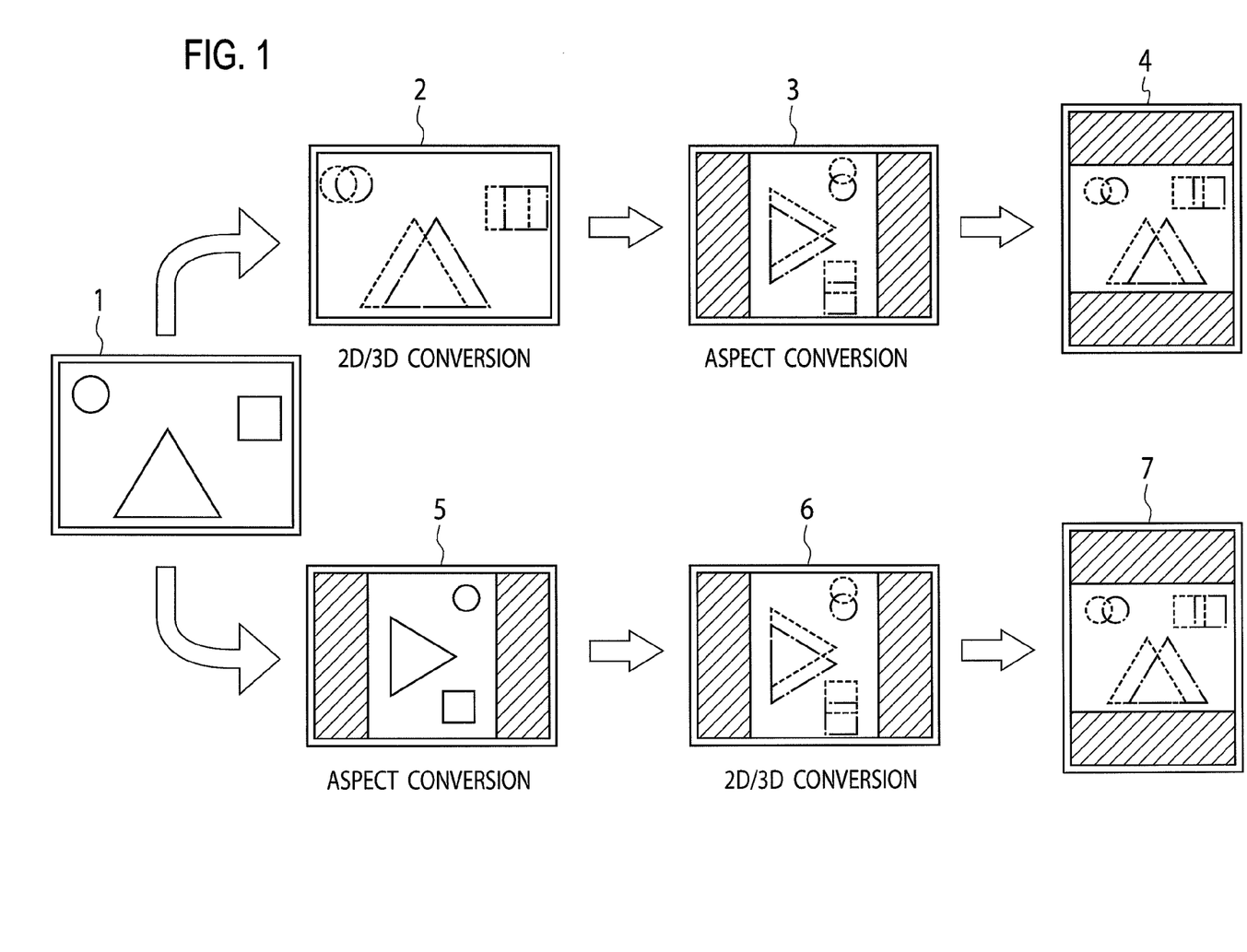
FIG. 1 is an image transition diagram illustrating a configuration pattern of 2D/3D conversion and aspect conversion.

When 2D/3D conversion is performed first and then aspect conversion is performed, a basic image 1 is converted into a 2D/3D converted image 2 as illustrated in FIG. 1, then converted into an aspect converted image 3, and becomes a completed image 4. With the method which performs 2D/3D conversion first, output signals are provided in a form in which a right-eye signal and a left-eye signal are shifted rightward and leftward. For example, a method is considered in which the right-eye signal and the left-eye signal are output for one frame, and respective signals are subjected to aspect conversion via a frame memory and output as output signals. However, the method has a problem that the required capacity of the frame memory used for aspect conversion doubles because the frame memory keeps the right-eye signal and the left-eye signal after 2D/3D conversion for each frame.

A method is conceivable which outputs the right-eye signal and the left-eye signal collectively in one frame, and performs aspect conversion via the frame memory to obtain an output signal. With this method, however, although the required capacity of the frame memory does not increase because the signal after 2D/3D conversion has a right-eye signal and a left-eye signal equivalent to one frame, the resolution of the right-eye signal and the left-eye signal falls, which leads to a problem of decreased precision of scaling performed at the time of aspect conversion.

When aspect conversion is performed first and then 2D/3D conversion is performed, the basic image 1 illustrated in FIG. 1 is converted into an aspect converted image 5, then converted into a 2D/3D converted image 6, and becomes a completed image 7. Since the method which performs aspect conversion first shifts the right-eye signal and the left-eye signal upward and downward, it is necessary to change the shift direction of 2D/3D conversion. For example, a method is conceivable in which an input signal is subjected to aspect conversion via the frame memory, and 2D/3D conversion thereafter, to be converted into an output signal. However, since the method performs 2D/3D conversion after aspect conversion, the shift direction of the right-eye signal and the left-eye signal of the output signal varies depending on whether the display unit is providing a portrait or landscape view. There arises a problem that it is necessary to prepare the line memory corresponding to the maximum shift.

Therefore, in view of the aforementioned problem, the present invention is directed to providing a three-dimensional image processor and a three-dimensional image processing method which realize 2D/3D conversion and aspect conversion with a smaller memory capacity to be used and without reducing scaling precision.

SUMMARY

According to a first aspect of the present invention, there is provided a three-dimensional image processor comprising: a discriminator that determines whether or not a read position of an input video signal is to be modified according to portrait or landscape orientation of an image based on the video signal and according to an identification signal indicating portrait or landscape orientation when a display unit displays the image based on the video signal, and generates a discrimination signal indicating whether or not the read position is to be modified; a parameter generator that generates a parameter indicating an aspect ratio of the image to be displayed by the display unit based on the video signal; a parallax generator that generates shift amounts for generating a left-eye signal and a right-eye signal based on the video signal; a frame memory unit that temporarily stores the video signal; and a controller that controls the read position of the video signal stored in the frame memory unit, wherein the controller controls the read position of the video signal based on the parameter and the shift amounts when the discrimination signal received from the discriminator indicates that the read position is to be modified, and the controller controls the read position of the video signal based on the shift amounts when the discrimination signal received from the discriminator indicates that the read position is not to be modified.

According to a second aspect of the present invention, there is provided a three-dimensional image processing method comprising: determining whether or not a read position of an input video signal is to be modified according to portrait or landscape orientation of an image based on the video signal, and according to an identification signal indicating portrait or landscape orientation when a display unit displays the image based on the video signal, and generating a discrimination signal indicating whether or not the read position is to be modified; generating a parameter indicating an aspect ratio of the image to be displayed by the display unit based on the video signal; generating shift amounts for generating a left-eye signal and a right-eye signal based on the video signal; controlling the read position of the video signal temporarily stored in a frame memory unit, based on the parameter and the shift amounts upon receiving the discrimination signal indicating that the read position is to be modified; and controlling the read position of the video signal temporarily stored in the frame memory unit, based on the shift amounts upon receiving the discrimination signal indicating that the read position is not to be modified.

According to the three-dimensional image processor and the three-dimensional image processing method of the present invention, a configuration can be realized which is capable of reducing memory capacity and reducing the circuit scale even if 2D/3D conversion function and aspect conversion function are provided therein.

DETAILED DESCRIPTION

Next, embodiments of the present invention will be described, referring to the drawings. In the following description of the drawings, identical or similar members are provided with identical or similar reference numerals. It should be however noted that the drawings are schematic. Furthermore, it should be noted that formulas described below are examples and may be modified as appropriate in a range where they are identical in essence.

(First Embodiment)
(Three-Dimensional Image Processor)

Figure 2:
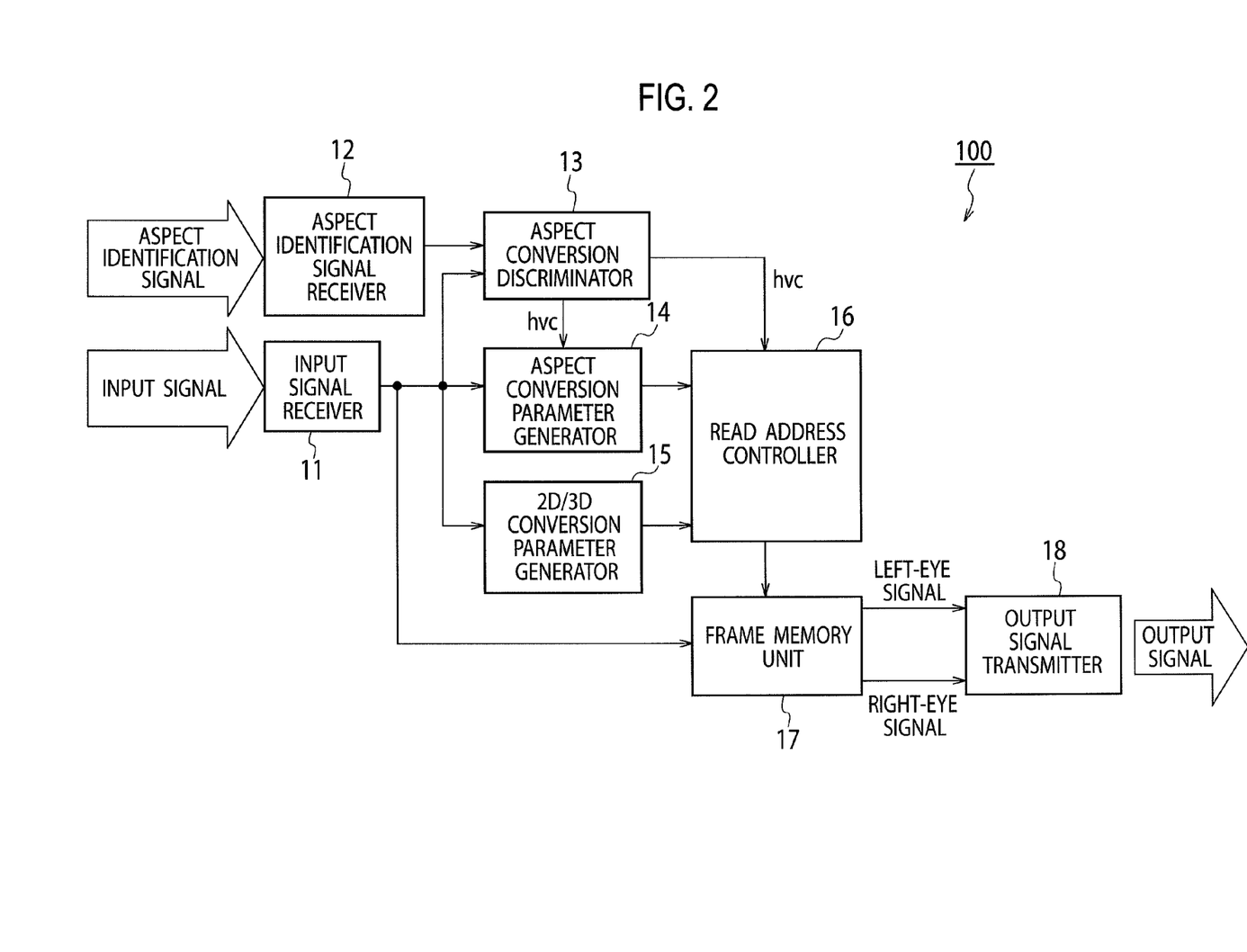
FIG. 2 illustrates a configuration of a three-dimensional image processor according to a first embodiment of the present invention.

A three-dimensional image processor 100 according to a first embodiment of the present invention will be described, referring to FIG. 2. The three-dimensional image processor 100 may be a portable device having a display unit such as a mobile phone, a smart phone, a book reader, a portable DVD player, a tablet PC, or the like.

The three-dimensional image processor 100 includes an input signal receiver 11, an aspect identification signal receiver 12, an aspect conversion discriminator 13, an aspect conversion parameter generator 14, a 2D/3D conversion parameter generator 15, a read address controller 16, a frame memory unit 17, and an output signal transmitter 18.

The input signal receiver 11 receives video signal data which is the target of aspect conversion and 2D/3D conversion. The input signal receiver 11 supplies the video signal to the aspect conversion discriminator 13, the aspect conversion parameter generator 14, the 2D/3D conversion parameter generator 15, and the frame memory unit 17.

The aspect identification signal receiver 12 receives an aspect identification signal for identifying portrait or landscape orientation (display orientation) of an image when a display unit (not illustrated) displays the video signal. The aspect identification signal may be, for example, a signal indicating whether an image output from a gravity sensor (not illustrated) to be displayed on the display unit has a portrait or landscape orientation, or a signal indicating an instruction manually input by a user who has determined whether the orientation of an image to be displayed on the display unit is portrait or landscape.

The aspect conversion discriminator 13 discriminates whether or not the read position of a video signal is modified, according to portrait or landscape orientation of an image based on an input video signal, and according to an identification signal indicating portrait or landscape orientation when a display unit displays the image based on the video signal, and generates a signal indicating whether or not the read position is modified. The aspect conversion discriminator 13 receives a video signal from the input signal receiver 11 and an aspect identification signal from the aspect identification signal receiver 12. The aspect conversion discriminator 13 discriminates, from the aspect identification signal and the image display orientation discriminated from the video signal, whether or not it is necessary to perform aspect conversion of the video signal to be output to the display unit. Discrimination of the image display orientation from the video signal may be made based on the user input or format of the video signal.

The aspect conversion discriminator 13 determines whether or not it is necessary to perform aspect conversion of the video signal to be output to the display unit on the basis of the image display orientation indicated by the aspect identification signal and on the basis of the image display orientation discriminated from the input video signal, and outputs a signal (referred to as aspect conversion signal in the following) hvc indicating whether or not aspect conversion is performed, to the aspect conversion parameter generator 14 and the read address controller 16. Upon determining that aspect conversion is necessary, the aspect conversion discriminator 13 outputs an aspect conversion signal hvc=1, whereas the aspect conversion discriminator 13 outputs an aspect conversion signal hvc=0 upon determining that aspect conversion is unnecessary.

For example, when the aspect identification signal indicates portrait orientation display of an image and the video signal provides an image with landscape orientation display, the aspect conversion discriminator 13 determines that aspect conversion is required (to be executed), and outputs the aspect conversion signal hvc (=1) indicating that aspect conversion is required.

The aspect conversion parameter generator 14, which is a parameter generator that generates a parameter indicating the aspect ratio of the image to be displayed on the display unit based on the video signal, generates the aspect ratio from the ratio of the number of horizontal effective pixels of the display unit to the number of vertical effective pixels thereof. The aspect conversion parameter generator 14 generates the scaling ratio of the video signal based on the aspect conversion signal hvc supplied from the aspect conversion discriminator 13. The scaling ratio is obtained from the ratio of the number of horizontal effective pixels of the display unit to the number of vertical effective pixels thereof.

The 2D/3D conversion parameter generator 15 is a parallax generator which generates shift amounts for generating a left-eye signal and a right-eye signal based on a video signal. The 2D/3D conversion parameter generator 15 receives a video signal from the input signal receiver 11, and generates shift amounts for generating a right-eye signal and a left-eye signal from the video signal, based on the characteristics of the video signal or the like. The 2D/3D conversion parameter is shift amounts providing the parallax between the right-eye signal and the left-eye signal when characteristics in one frame of the video signal are detected.

The frame memory unit 17 frame-delays, in other words, temporarily stores, the video signal received from the input signal receiver 11.

The read address controller 16 controls the read position of the video signal stored in the frame memory unit 17. Upon receiving from the aspect conversion discriminator 13 a signal indicating that the read position is to be modified, the read address controller 16 controls the read position of the video signal based on the parameter and shift amounts, whereas the read address controller 16 controls the read position of the video signal based on the shift amounts upon receiving from the aspect conversion discriminator 13 a signal indicating that the read position is not to be modified. The read address controller 16 determines the read position of the video input signal to be temporarily stored in the frame memory unit 17, on the basis of the scaling ratio received from the aspect conversion parameter generator 14, and on the basis of the shift amounts for generating the left-eye signal and the right-eye signal received from the 2D/3D conversion parameter generator 15.

The output signal transmitter 18 outputs, to a display device or the like, a video signal resulting from applying a predetermined conversion process to a video signal.

(Image Conversion Operation in the Three-Dimensional Image Processor)

Figure 3:
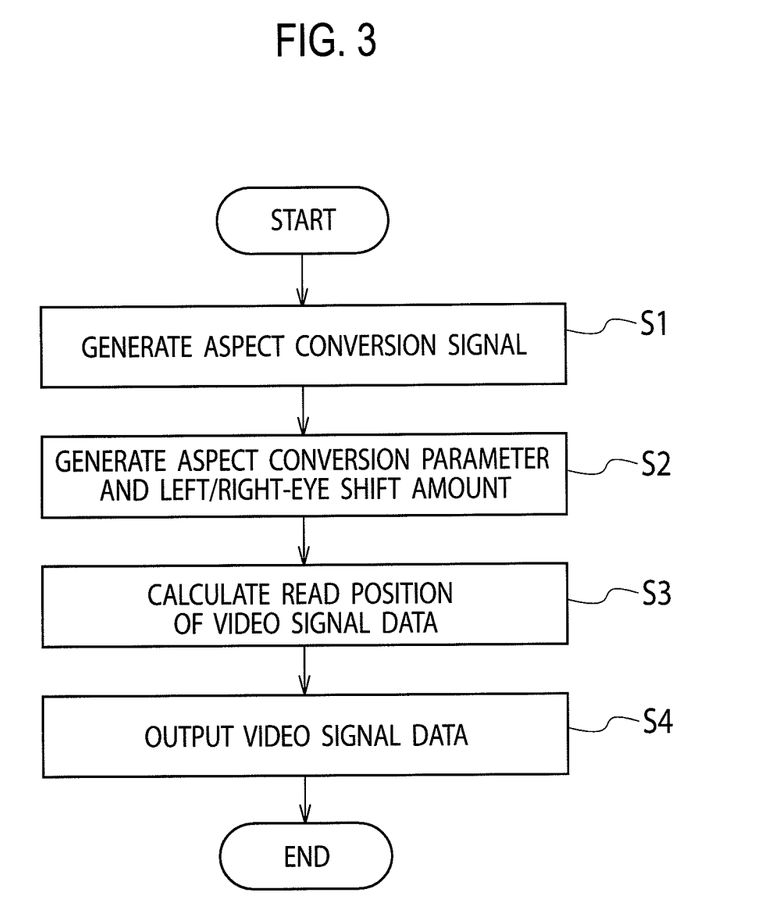
FIG. 3 is a flow chart of a three-dimensional image processing method according to the first embodiment of the present invention.

An image conversion operation (three-dimensional image processing method) in the three-dimensional image processor 100 will be described, referring to FIG. 3. The aspect conversion discriminator 13 determines whether or not it is necessary to perform aspect conversion of the video signal to be output to the display unit, on the basis of the image display orientation indicated by the aspect identification signal and on the basis of the image display orientation discriminated from the input video signal, and generates the aspect conversion signal hvc (step Si). The aspect conversion parameter generator 14 receives the aspect conversion signal hvc discriminated and output by the aspect conversion discriminator 13 and the video signal data transmitted from the input signal receiver 11, and generates the aspect conversion parameter (step S2).

The aspect conversion parameter generator 14 generates, as a parameter, a scale factor k with the number of horizontal effective pixels of the display unit being Ph and the number of vertical effective pixels thereof being Pv. The scale factor k is defined as value 1.

$k=Ph/Pv$ (value 1)

Here, when the aspect conversion signal hvc indicates that aspect conversion is unnecessary (0), the aspect conversion parameter generator 14 outputs a predetermined value 1 (k=1) as the scale factor k to the read address controller 16.

The aspect conversion discriminator 13 outputs the aspect conversion signal hvc to the read address controller 16. The aspect conversion signal hvc is defined as value 2.

In addition, the 2D/3D conversion parameter generator 15 generates, from the characteristics of the video signal data, the right-eye shift amount and the left-eye shift amount as parameters (step S2).

right-eye shift amount αr (value 3)

left-eye shift amount αl (value 4)

Upon receiving a value 1 (k=Ph/Pv or k=1), a value 2, a value 3 and a value 4 from the aspect conversion discriminator 13, the aspect conversion parameter generator 14, and the 2D/3D conversion parameter generator 15, the read address controller 16 calculates the read position of the video signal data in the frame memory unit 17 (step S3). Here, the aspect conversion signal hvc defined as value 2 may be supplied from the aspect conversion parameter generator 14 to the read address controller 16.

First, description will be given as to the read position calculated by the read address controller 16 for a case that the aspect conversion signal hvc defined as value 2 indicates no aspect conversion (hvc=0). When the aspect conversion is not performed, the shift in 2D/3D conversion is performed in the horizontal scanning direction of the display unit and therefore the 2D/3D conversion parameter is provided only in the horizontal direction. Accordingly, the read addresses for the right eye and the left eye in the coordinates (x, y) of an arbitrary pixel are respectively located at the positions indicated by formulas 1 and 2, which are displaced in the horizontal direction by the shift amounts corresponding to the 2D/3D parameter. The aspect conversion signal hvc (hvc=0) received by the read address controller 16 is a signal indicating that the read position is not to be modified.

right-eye read address $(x+\alpha r, y)$ (formula 1)

left-eye read address $(x+\alpha l, y)$ (formula 2)

Next, description will be given as to the read position calculated by the read address controller 16 for a case that the aspect conversion signal hvc defined as value 2 indicates that aspect conversion is performed (hvc=1). When aspect conversion is performed, the shift in 2D/3D conversion is performed in the vertical scanning direction of the display unit and therefore the 2D/3D conversion parameter is provided only in the vertical direction. An aspect conversion performed as a 90-degree clockwise rotation relocates the top and bottom of the image at the right and left sides of the display unit, and the right and left sides of the image are relocated at the top and bottom of the display unit. Accordingly, the horizontal coordinate after aspect conversion takes a value obtained by subtracting the vertical coordinate before the conversion from the number of the vertical pixels, and the vertical coordinate after aspect conversion is the horizontal coordinate before the conversion. In addition, when scaling is performed along with aspect conversion, it is necessary to take into account the scaling ratio additionally. As thus described, the read addresses for the right eye and for the left eye for the coordinates (x, y) of an arbitrary pixel are the positions indicated by formulas 3 and 4, in which the y-coordinate is displaced in the vertical direction by the amount corresponding to the 2D/3D parameter, followed by an aspect conversion, and both coordinates are further multiplied by a scale factor associated therewith. The aspect conversion signal hvc (hvc=1) received by the read address controller 16 is a signal indicating that the read position is to be modified.

right-eye read address $(k(Pv-(y+\alpha r)), kx)$ (formula 3)

left-eye read address $(k(Pv-(y+\alpha l)), kx)$ (formula 4)

The number of the vertical pixels Pv used in formulas 3 and 4 is acquired from the aspect conversion parameter generator 14 by the read address controller 16.

The video signal which has been subjected to the predetermined conversion process is output from the output signal transmitter 18 to the display unit or the like (step S4).

The read address controller 16 selectively uses formulas 1 to 4 in accordance with the aspect conversion signal hvc to control the read address of the frame memory unit 17, so that neither an independent memory nor a register need be used for the shift in 2D/3D conversion, which leads to reduction in the circuit scale.

(Second Embodiment)
(Three-Dimensional Image Processor)

Figure 4:
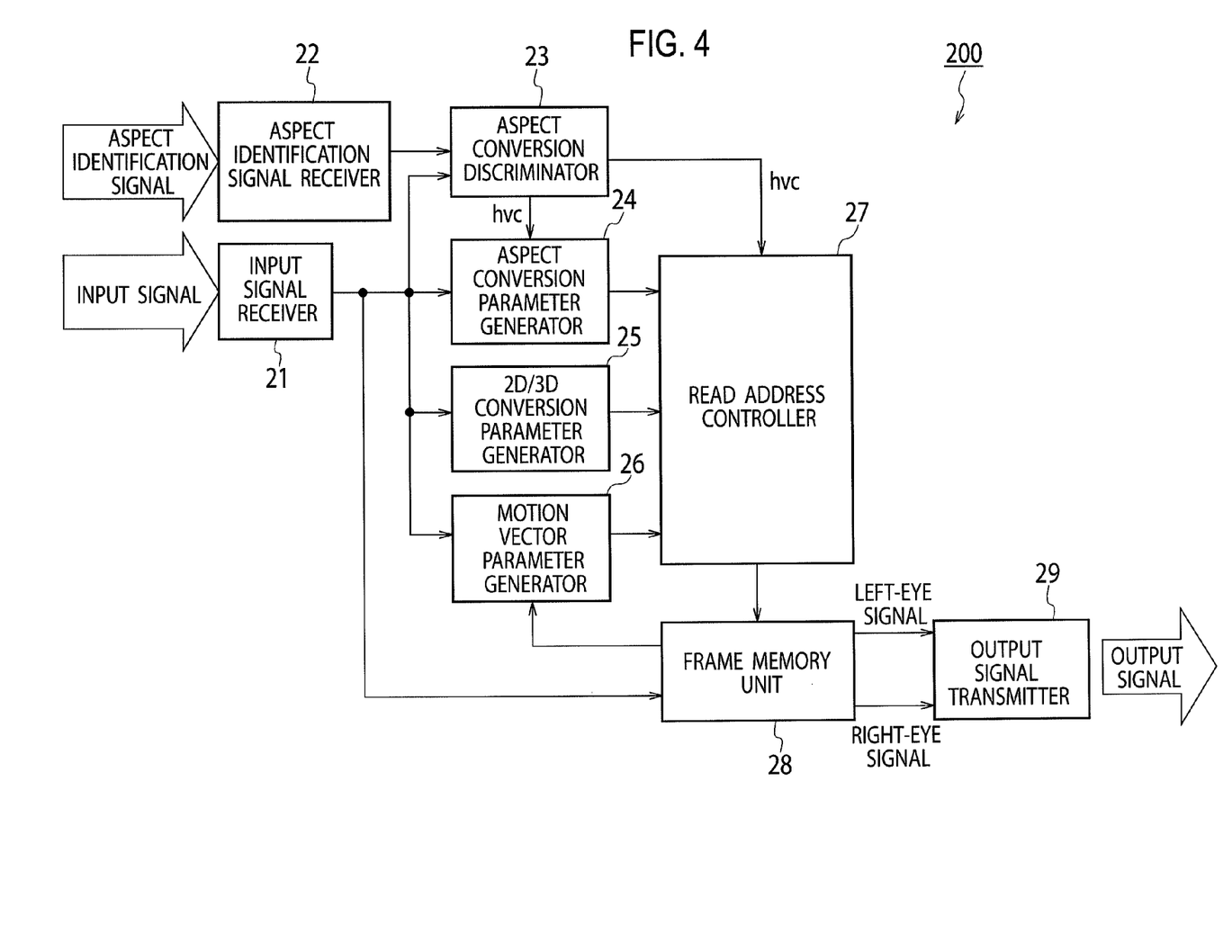
FIG. 4 illustrates a configuration of a three-dimensional image processor according to a second embodiment of the present invention.

A three-dimensional image processor 200 according to a second embodiment of the present invention will be described, referring to FIG. 4.

The three-dimensional image processor 200 includes an input signal receiver 21, an aspect identification signal receiver 22, an aspect conversion discriminator 23, an aspect conversion parameter generator 24, a 2D/3D conversion parameter generator 25, a motion vector parameter generator 26, a read address controller 27, a frame memory unit 28, and an output signal transmitter 29.

The three-dimensional image processor 200 is different from the three-dimensional image processor 100 according to the first embodiment in terms of the motion vector parameter generator 26 and the read address controller 27. Other components, namely the input signal receiver 21, the aspect identification signal receiver 22, the aspect conversion discriminator 23, the aspect conversion parameter generator 24, the 2D/3D conversion parameter generator 25, the frame memory unit 28, and the output signal transmitter 29 operate similarly to the components having the same names in the three-dimensional image processor 100, and thus their explanation is omitted.

The motion vector parameter generator 26 generates a motion vector parameter determined by a difference between the video signal and a signal resulting from frame-delaying the video signal by the frame memory unit 28. Specifically, the motion vector is calculated from a video signal received by the input signal receiver 21 and a signal resulting from frame-delaying the video signal by the frame memory unit 28. The motion vector parameter has its horizontal and vertical components exchanged due to aspect conversion, with the horizontal motion vector contributing to address control in the vertical direction and the vertical motion vector contributing to the address control in the horizontal direction, at the time of aspect conversion.

The read address controller 27 is a controller which controls the read position of the video signal based on the parameter, the shift amounts and the motion vector upon receiving a signal (hvc=1) indicating that the read position is to be modified from the aspect conversion discriminator 23, and controls the read position of the video signal based on the shift amounts and the motion vector upon receiving a signal (hvc=0) indicating that the read position is not to be modified from the aspect conversion discriminator 23. The read address controller 27 determines the read position of the video input signal temporarily stored in the frame memory unit 28, based on the scaling ratio received from the aspect conversion parameter generator 24 at the time of aspect conversion in the case of performing aspect conversion, the shift amounts of the left-eye signal and the right-eye signal received from the 2D/3D conversion parameter generator 25, and the motion vector received from the vector parameter generator 26.

(Image Conversion Operation in the Three-Dimensional Image Processor)

Figure 5:
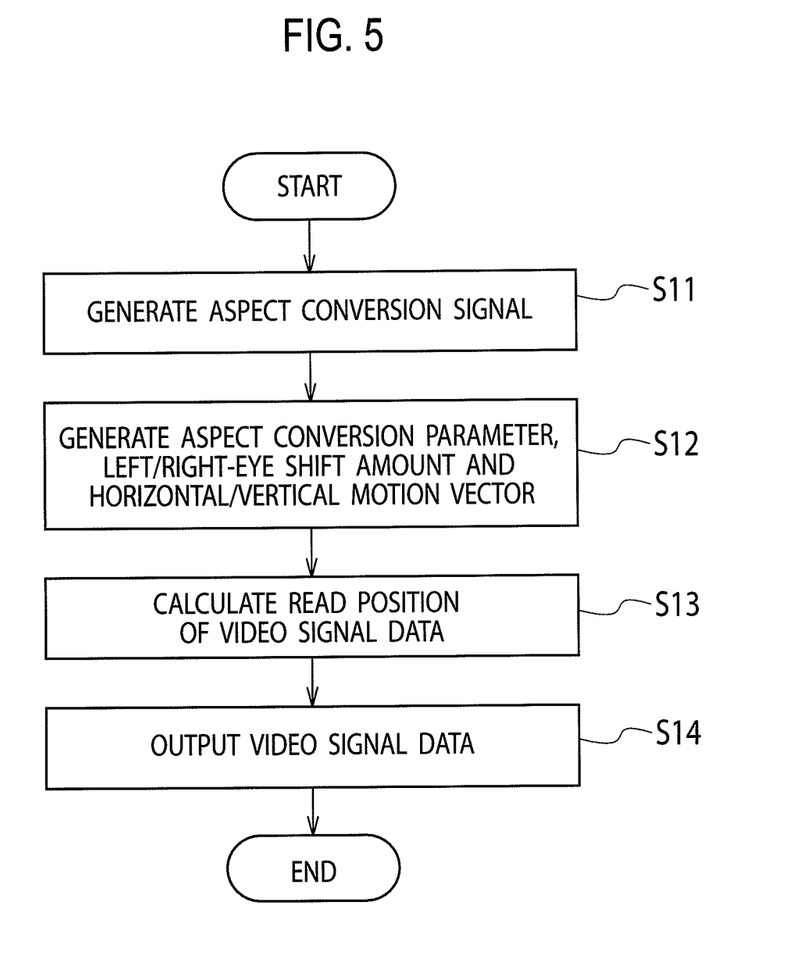
FIG. 5 is a flow chart of a three-dimensional image processing method according to the second embodiment of the present invention.

An image conversion operation (three-dimensional image processing method) in the three-dimensional image processor 200 will be described, referring to FIG. 5. The aspect conversion discriminator 23 determines whether or not it is necessary to perform aspect conversion of the video signal to be output to the display unit on the basis of the image display orientation indicated by the aspect identification signal and on the basis of the image display orientation discriminated from the input video signal, and generates the aspect conversion signal hvc (step S11). The aspect conversion parameter generator 24 receives the aspect conversion signal hvc discriminated and output by the aspect conversion discriminator 23 and the video signal data transmitted from the input signal receiver 21, and generates the aspect conversion parameter (step S12).

Similarly to the first embodiment, the following values are used as parameters, which are output from the aspect conversion parameter generator 24 and the 2D/3D conversion parameter generator 25.

The aspect conversion parameter generator 24 generates the scale factor k as a parameter, with the number of horizontal effective pixels of the display unit being Ph and the number of vertical effective pixels being Pv. The scale factor k is defined as value 1.

$k=Ph/Pv$ (value 1)

In addition, the aspect conversion parameter generator 24 outputs the aspect conversion signal hvc which has been output from the aspect conversion discriminator 23. The aspect conversion signal hvc is defined as value 2.

The 2D/3D conversion parameter generator 25 generates the right-eye shift amount and the left-eye shift amount as parameters (step S12).

right-eye shift amount $\alpha r$ (value 3)

left-eye shift amount $\alpha l$ (value 4)

Furthermore, the motion vector parameter generator 26 generates the horizontal motion vector and the vertical motion vector in the second embodiment (step S12), and outputs them.

horizontal motion vector $\beta h$ (value 5)

vertical motion vector $\beta v$ (value 6)

The read address controller 27 receives all the values 1 to 6, and calculates the read position of the video signal data in the frame memory unit 28 (step S13).

Description will be given below as to the read position calculated by the read address controller 27 for a case that the aspect conversion signal hvc defined as value 2 indicates no aspect conversion (hvc=0). In the case of no aspect conversion, the orientation to which the motion vector parameter contributes is the same orientation as the image display orientation in the display unit, and therefore the read addresses of the left-eye and the right-eye in the coordinates (x, y) of an arbitrary pixel are given by adding the motion vector parameters to the read addresses of formulas 1 and 2, respectively. Accordingly, the addresses are located at positions indicated by formulas 5 and 6.

right-eye read address $(x+\alpha r+\beta h, y+\beta v)$ (formula 5)

left-eye read address $(x+\alpha l+\beta h, y+\beta v)$ (formula 6)

Next, description will be given below as to the read position calculated by the read address controller 27 for a case that the aspect conversion signal hvc defined as value 2 indicates that aspect conversion is performed (hvc=1) When aspect conversion is performed, the orientation to which the motion vector parameter contributes is a perpendicular orientation to the image display orientation in the display unit, and therefore the read addresses of the left-eye and the right-eye in the coordinates (x, y) of an arbitrary pixel are given by adding the motion vector parameters to the read addresses of formulas 3 and 4, respectively, resulting in positions indicated by formulas 7 and 8.

right-eye read address $$(k(Pv-(y+\alpha r+\beta v)), k(x+\beta h)) \quad \text{(formula 7)}$$

left-eye read address $$(k(Pv-(y+\alpha l+\beta v)), k(x+\beta h)) \quad \text{(formula 8)}$$

The number of vertical pixels Pv used in formulas 7 and 8 is obtained from the aspect conversion parameter generator 24 by the read address controller 27.

The video signal data which has been subjected to the predetermined conversion process is output from the output signal transmitter 29 to the display unit or the like (step S14).

When the read address controller 27 selectively uses formulas 5 to 8 in accordance with the aspect conversion signal hvc to perform address control, in addition to shift in 2D/3D conversion, also in interpolation frame generation by the motion vector, a configuration becomes possible in which neither an independent memory nor a register is needed, which leads to reduction in the circuit scale.

According to the three-dimensional image processor of the present invention, when performing 2D/3D conversion and aspect conversion on an image, controlling the read position from the memory prevents degradation of the scaling precision and also allows each function to be realized without requiring an independent memory, in other words, it becomes possible to reduce memory capacity and reduce the circuit scale.

What is claimed is:

1. A three-dimensional image processor comprising:
   a discriminator that determines whether or not a read position of an input video signal is to be modified according to portrait or landscape orientation of an image based on the video signal and according to an identification signal indicating portrait or landscape orientation when a display unit displays the image based on the video signal, and generates a discrimination signal indicating whether or not the read position is to be modified;
   a parameter generator that generates a parameter indicating an aspect ratio of the image to be displayed by the display unit based on the video signal;
   a parallax generator that generates shift amounts for generating a left-eye signal and a right-eye signal based on the video signal;
   a frame memory unit that temporarily stores the video signal;
   a controller that controls the read position of the video signal stored in the frame memory unit; and
   a motion vector parameter generator that determines a motion vector by a difference of signals between frames of the video signal, wherein
   the controller controls the read position of the video signal based on the parameter, the shift amounts and the motion vector when the discrimination signal received from the discriminator indicates that the read position is to be modified, and controls the read position of the video signal based on the shift amounts and the motion vector when the discrimination signal received from the discriminator indicates that the read position is not to be modified, and
   the controller controls the read position of the video signal based on the parameter and the shift amounts when the discrimination signal received from the discriminator indicates that the read position is to be modified, and the controller controls the read position of the video signal based on the shift amounts when the discrimination signal received from the discriminator indicates that the read position is not to be modified.

2. The three-dimensional image processor according to claim 1, wherein the parameter generator generates the aspect ratio from a ratio of the number of horizontal effective pixels of the display unit to the number of vertical effective pixels thereof.

3. The three-dimensional image processor according to claim 1, wherein the motion vector parameter generator determines the motion vector by a difference between the video signal and a signal resulting from frame-delaying the video signal by the frame memory unit.

4. A three-dimensional image processing method comprising:
   determining whether or not a read position of an input video signal is to be modified according to portrait or landscape orientation of an image based on the video signal, and according to an identification signal indicating portrait or landscape orientation when a display unit displays the image based on the video signal, and generating a discrimination signal indicating whether or not the read position is to be modified;
   generating a parameter indicating an aspect ratio of the image to be displayed by the display unit based on the video signal;
   generating shift amounts for generating a left-eye signal and a right-eye signal based on the video signal;
   controlling the read position of the video signal temporarily stored in a frame memory unit, based on the parameter and the shift amounts upon receiving the discrimination signal indicating that the read position is to be modified;
   controlling the read position of the video signal temporarily stored in the frame memory unit, based on the shift amounts upon receiving the discrimination signal indicating that the read position is not to be modified; and
   determining a motion vector by a difference of signals between frames of the video signal,
   wherein the read position of the video signal is controlled based on the parameter, the shift amounts and the motion vector, upon reception of the discrimination signal indicating that the read position is to be modified, and
   the read position of the video signal is controlled based on the shift amounts and the motion vector upon reception of the discrimination signal indicating that the read position is not to be modified.

5. The three-dimensional image processing method according to claim 4, wherein the aspect ratio is generated from a ratio of the number of horizontal effective pixels of the display unit to the number of vertical effective pixels thereof.

6. The three-dimensional image processing method according to claim 4, wherein the motion vector is determined by a difference between the video input signal and a signal resulting from frame-delaying the video input signal by the frame memory unit.

\* \* \* \* \*